Patented Oct. 24, 1944

2,361,036

UNITED STATES PATENT OFFICE 2,361,036

PREPARATION OF ALPHA-BETA UNSATURATED CARBOXYLIC ACIDS

Frederick E. Kung, Akron, Ohio, assignor to The B. F. Goodrich Company, New York, N. Y., a corporation of New York No Drawing. Application July 31, 1941, Serial No. 404,906

8 Claims. (Cl. 260—526)

This invention relates to a new method of preparing alpha-beta unsaturated carboxylic acids particularly the low molecular weight alpha-beta unsaturated monocarboxylic acids such as acrylic acid and substituted acrylic acids. More specifically, this invention relates to the polymerization of lactones of beta hydroxy carboxylic acids, and to the pyrolysis of the polymerization products so produced.

In a copending application Serial No. 393,671, filed May 15, 1941, an economical method of preparing lactones of beta hydroxy carboxylic acids from the reaction of a ketene with a carbonyl compound such as an aldehyde or ketone has been described. The ease with which such lactones are now obtained makes it desirable to use these compounds as starting materials for the synthesis of unsaturated compounds such as acids, esters and nitriles, all of which are extremely useful as polymerizable materials in the production of synthetic rubber, synthetic resins and the like.

The obvious method of preparing an unsaturated acid, for example acrylic acid, from a beta lactone, for example hydracrylic acid lactone, would be to hydrolyze the lactone to hydracrylic acid and then to dehydrate this hydroxy acid to acrylic acid. It has been observed however that this method does not give good yields of the desired product, particularly when working with low molecular weight aliphatic compounds, partly because of the instability of the lactones used as starting materials and their tendency to polymerize under the hydrolyzing conditions employed and partly because of the inability to find conditions under which the dehydration of the hydroxy acid to the unsaturated acid may be carried out in good yields.

I have now discovered a new method of preparing unsaturated acids from beta lactones which is not subject to these disadvantages and which produces very high yields of the desired acid while employing conditions which are easily controlled. This method comprises first polymerizing the monomeric lactone to a polymeric material believed to be a linear polyester, and then depolymerizing or pyrolyzing the polymeric material to form an alpha-beta unsaturated carboxylic acid.

The beta lactones which may be employed in the process of this invention may be defined as beta lactones of monocarboxylic acids having at least one unsubstituted hydrogen atom on the alpha carbon atom and containing only unreactive hydrocarbon substituents. Structurally these compounds have the formula:

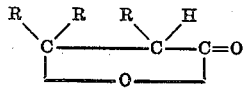

where R is hydrogen or an unreactive hydrocarbon radical such as an alkyl, aryl aralkyl or a cycloalkyl radical. Included in this class of compounds are the beta lactones of saturated aliphatic mono-carboxylic acids containing at least one hydrogen on the alpha carbon atom such as hydracrylic acid lactone, beta-hydroxy butyric acid lactone, alpha-methyl hydracrylic acid lactone, beta-hydroxy n-valeric acid lactone, beta-hydroxy alpha-methyl butyric acid lactone, alpha-ethyl hydracrylic acid latcone, beta-hydroxy isovaleric acid lactone, beta-hydroxy n-capric acid lactone, beta-hydroxy alpha-methyl valeric acid lactone, beta-methyl beta-ethyl hydracrylic acid lactone, alpha-methyl beta-ethyl hydracrylic acid lactone, alpha-methyl beta-methyl hydracrylic acid lactone, alpha-propyl hydracrylic acid lactone, alpha-butyl hydracrylic acid lactone, beta-methyl beta-propyl hydracrylic acid lactone and the like; the beta lactones of aryl substituted carboxylic acids such as beta-phenyl hydracrylic acid lactone, alpha-phenyl hydracrylic acid lactone and the like and other beta lactones of substituted carboxylic acids such as beta- cyclohexyl hydracrylic acid lactone, beta-benzyl hydracrylic acid lactone and the like. Lactones of acids containing reactive hydrocarbon substituents such as vinyl, alkyl, divinyl, or acetylenic substituents are preferably not employed because of their great reactivity at the unsaturated bond and hence are not included in the class of lactones herein claimed. The preferred compounds are the beta lactones containing less than six carbon atoms, particularly the low molecular weight aliphatic lactones, since the difficulty of carrying out the reaction is increased when employing lactones of higher molecular weight.

As mentioned hereinabove, in the process of this invention a beta lactone is first polymerized to form a polymeric material and then the polymeric material is pyrolyzed to form an alpha beta unsaturated acid. The acid formed will have the same number of carbon atoms as the lactone used in the process. Thus, hydracrylic acid lactone yields acrylic acid; beta-hydroxy butyric acid lactone yields crotonic acid; beta-hydroxy isovaleric acid lactone yields beta-beta dimethyl acrylic acid; alpha-methyl hydracrylic acid lactone yields alpha-methyl acrylic acid; beta-phenyl hydracrylic acid lactone yields cinnamic acid and similarly other lactones yield other alpha-beta unsaturated acids.

The first step in the process of this invention, i. e., the polymerization of the beta lactone may be carried out in a variety of ways depending upon the particular lactone employed and the relative ease with which it is polymerized. Low molecular weight aliphatic lactones which contain at least one hydrogen in the alpha position are polymerized readily simply by the application of heat, pressure, or actinic light or by the action of a number of substances which are termed catalysts. In fact these lactones polymerize so easily that one of the difficulties experienced in their preparation is to isolate the lactone under conditions which avoid polymerization. The most convenient method of polymerizing the lactone is to heat the lactone or a solution of the lactone in a suitable solvent in the presence of a catalyst. Effective catalysts are, in general, substances which promote condensation reactions including alkaline materials such as potassium carbonate, sodium carbonate, potassium acetate, sodium hydroxide, sodium cyanide, ammonia, pyridine, quinoline, trimethyl amine, triethanol amine, dimethyl aniline and the like; Friedel-Crafts type condensation catalysts such as zinc chloride, aluminum chloride, boron fluoride, iron chloride, stannic chloride or complexes of these compounds with organic compounds such as ethyl ether, ethyl chloride, isopropyl chloride and the like; and other acidic condensation catalysts such as hydrogen chloride and the like. Although some polymerization takes place at ordinary room temperature or even lower temperatures, particularly with acid catalysts such as hydrogen chloride, boron fluoride, ethyl ether and stannic chloride, the polymerization is much more rapid if the lactone is heated in presence of the catalysts. Polymerization is more rapid in the absence of a solvent. The amount of the catalyst should be only very small in proportion to the amount of lactone treated, less than 1% by weight being sufficient.

After the polymerization reaction is initiated by heating the lactone to a temperature ranging from about 70 to 150° C. in presence of a catalyst, the reaction then becomes exothermic and it is often necessary to provide cooling in order to keep the reaction under control. The length of time necessary to form a polymeric material from the lactone varies with the individual compound used from only a few minutes when hydracrylic lactone is heated to 100° C. in presence of a catalyst to several hours when higher molecular weight lactones are used. Completion of the polymerization is shown by the change in character of the material treated and by the cessation of heat evolution.

The polymeric material obtained by polymerization varies in nature from a thick viscous semisolid mass to a resinous solid material. These polymers are believed to be linear polymeric esters of a molecular weight varying from about 500 to 2000 having a structure which may be represented as follows:

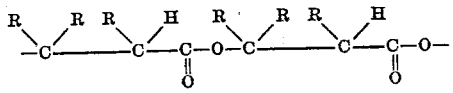

The second step in the production of alpha-beta unsaturated acids from beta-lactones consists in pyrolyzing the polymeric lactones. This may be accomplished by heating the polymeric material either at atmospheric or reduced pressure to a temperature at which the polymeric material begins to decompose. The most convenient method of operating is to produce the polymer by heating in presence of a catalyst as shown hereinabove, and then after the polymerization reaction has subsided to apply more heat, until the polymeric material begins to evolve the desired alpha-beta unsaturated acid. The latter heating process is preferably carried out at reduced pressure.

Although the production of alpha-beta unsaturated acids from beta-lactones has been described as a two step reaction in order to indicate the chemical changes which occur, it is to be understood that it is not necessary to isolate the polymeric intermediate. Thus it is possible to pass the lactone over a heated catalyst contained in a reaction tube or tower and to directly obtain as the product the desired alpha-beta unsaturated acid. In such a procedure the temperature inside the tube or tower should be sufficiently high to bring about both the polymerization of the lactone and the simultaneous pyrolysis of the polymeric lactone, temperatures above 150° C. and not over about 300° C. being effective. As an example of this method of practicing the invention hydracrylic acid lactone when passed over a zinc chloride catalyst at 200° C. directly yields acrylic acid.

The invention is further illustrated by the following examples.

*Example I*

A trace of potassium carbonate (0.1 g) is added to 20 g. of hydracylic acid lactone contained in a 50 ml. Anders flask and the material is heated to about 100°-130° C. A vigorous exothermic reaction takes place. The contents of the flask are kept at about 130° C. by cooling with water. After about ½ hour no more heat is evolved and a viscous semi-solid mass is obtained. This material is then heated at a reduced pressure of 8-10 mm. and when the temperature of the mixture is at about 150°-175° C. a vapor is evolved, the temperature of the vapor being about 50° C. The distillate consists of 19 g. (95%) of acrylic acid.

*Example II*

Fifteen grams of beta-hydroxy butyric acid lactone are treated as in Example I. The temperature necessary for polymerization is about 150° C. When the polymeric material so obtained is heated to 180°-190° C. a distillate is obtained. From this distillate 9.5 g. (30%) of crotonic acid M. P. 70° C. is obtained by recrystallization.

As mentioned hereinabove my copending application Serial No. 393,671, describes a method of preparing beta lactones from a ketene and a carbonyl compound. In general the same catalysts are effective in polymerizing beta lactones as are used in the reaction which yields the lactone. As explained in my copending application, when working with certain carbonyl compounds and ketenes the lactone produced is difficult to isolate and, unless the catalyst is first decomposed and the lactone is distilled at reduced pressure, a polymeric lactone is obtained instead of the monomeric lactone. Accordingly, it is sometimes possible to pyrolyze the polymeric lactone obtained from this reaction and thus prepare an alpha-beta unsaturated acid. This invention contemplates carrying out the reaction in this manner. The polymeric lactones which may be produced in this manner and then pyrolyzed to an unsaturated acid are, in general, lactones prepared from the reaction of an aldo-ketene such as ketene, methyl ketene, ethyl ketene or the like, with a low molecular weight carbonyl compound which contains the carbonyl group

as the sole functional group, preferably one containing less than six carbon atoms such as formaldehyde, acetaldehyde, propionaldehyde, furfural, acetone, methyl ethyl ketone and the like. When other aldehydes or ketones are reacted with ketenes without isolating the lactone, a polymeric lactone does not result but rather other products are formed.

Although the invention has been described in relation to preferred embodiments, numerous modifications will be apparent. Hence it is not intended that the invention be limited except by the spirit and scope of the appended claims.

I claim:

1. A method of producing an alpha-beta unsaturated monocarboxylic acid which comprises polymerizing a monomeric beta-lactone of a monocarboxylic acid having at least one unsubstituted hydrogen atom on its alpha carbon atom and containing only unreactive hydrocarbon substituents, to form a polymeric material, and subsequently pyrolyzing the polymeric material to give an alpha-beta unsaturated monocarboxylic acid.

2. A method of producing an alpha-beta unsaturated aliphatic monocarboxylic acid which comprises polymerizing in the presence of a condensation catalyst a monomeric beta-lactone of a saturated aliphatic monocarboxylic acid having at least one hydrogen atom on its alpha carbon atom, to form a polymeric material, and subsequently heating the polymeric material to its decomposition temperature whereby an alpha-beta unsaturated aliphatic monocarboxylic acid is formed.

3. A method of producing acrylic acid which comprises polymerizing monomeric hydracrylic acid lactone in the presence of a condensation catalyst to form a polymeric material, and subsequently heating the polymeric material to its decomposition temperature whereby acrylic acid is formed.

4. A method of producing a low molecular weight alpha-beta unsaturated monocarboxylic acid which comprises polymerizing a monomeric beta lactone of a low molecular weight saturated aliphatic monocarboxylic acid having at least one hydrogen atom on its alpha carbon atom, in the presence of a condensation catalyst at a temperature of 50-150° C. to form a polymeric material, and subsequently heating the polymeric material to its decomposition temperature at reduced pressure, whereby a low molecular weight alpha-beta unsaturated monocarboxylic acid is formed.

5. A method of producing an alpha-beta unsaturated monocarboxylic acid which comprises heating to its decomposition temperature a polymer of a beta-lactone of a monocarboxylic acid having at least one unsubstituted hydrogen atom on its alpha carbon atom and containing only unreactive hydrocarbon substituents.

6. A method of producing acrylic acid which comprises heating a polymer of hydracrylic acid lactone to its decomposition temperature at reduced pressure.

7. A method of producing acrylic acid which comprises passing hydracrylic acid lactone over a condensation catalyst at a temperature of 150-300° C.

8. A method of producing a low molecular weight alpha-beta unsaturated monocarboxylic acid which comprises passing a monomeric beta lactone of a low molecular weight saturated aliphatic monocarboxylic acid having at least one hydrogen atom on its alpha carbon atom, over a condensation catalyst at a temperature of 150-300° C.

FREDERICK E. KUNG.